US012688226B1

(12) United States Patent　　(10) Patent No.: US 12,688,226 B1

Iyer et al.　　(45) Date of Patent: Jul. 21, 2026

(54) AUTOMATING COMPLIANCE CONTROL MAPPING WITH AI AND LLMS

(71) Applicant: Kovr.AI Corp., Reston, VA (US)

(72) Inventors: Sri Iyer, Reston, VA (US); Andrew Black, Reston, VA (US)

(73) Assignee: Kovr.AI Corp., Reston, VA (US)

( * ) Notice: Subject to any disclaimer, the term of this patent is extended or adjusted under 35 U.S.C. 154(b) by 0 days.

(21) Appl. No.: 19/280,812

(22) Filed: Jul. 25, 2025

(51) Int. Cl.
　　G06F 16/41　　(2019.01)
　　G06F 16/31　　(2019.01)

(52) U.S. Cl.
　　CPC .............. G06F 16/41 (2019.01); G06F 16/31 (2019.01)

(58) Field of Classification Search
　　CPC ........ G06F 16/31; G06F 16/316; G06F 16/41; G06F 16/9024
　　See application file for complete search history.

(56) References Cited

U.S. PATENT DOCUMENTS

| | | | | |
|---|---|---|---|---|
| 11,410,184 | B2 * | 8/2022 | Marascu .............. | G06Q 30/018 |
| 12,198,030 | B1 * | 1/2025 | Mysore .............. | G06F 11/3684 |
| 2018/0137107 | A1 * | 5/2018 | Buccapatnam Tirumala .............. G06F 16/3346 |
| 2020/0089758 | A1 * | 3/2020 | Reddi ................... | G06F 40/242 |
| 2020/0143388 | A1 * | 5/2020 | Duchin ................ | G06F 16/258 |
| 2023/0074771 | A1 * | 3/2023 | Nefedov ............. | G06F 16/9024 |
| 2023/0316184 | A1 * | 10/2023 | Erwin .............. | G06Q 10/06315 705/7.25 |

| | | | | |
|---|---|---|---|---|
| 2024/0232693 | A1 * | 7/2024 | Ahuja ................. | G06F 16/2365 |
| 2025/0111202 | A1 * | 4/2025 | Ghaeini .............. | G06N 3/0455 |
| 2025/0139642 | A1 * | 5/2025 | Radhakrishnan .... | G06Q 30/018 |

FOREIGN PATENT DOCUMENTS

| | | | | |
|---|---|---|---|---|
| CN | 120509388 A | * | 8/2025 | ............. G06V 30/41 |

OTHER PUBLICATIONS

Echenim et al. ("Automating IoT Data Privacy Compliance by Integrating Knowledge Graphs With Large Language Models," in IEEE Access, vol. 13, pp. 118438-118451, Jul. 14, 2025, doi: 10.1109/ACCESS.2025.3586278 (Year: 2025).*
Breaux et al., "Mapping legal requirements to IT controls," 2013 6th International Workshop on Requirements Engineering and Law (RELAW), Rio de Janeiro, Brazil, 2013, pp. 11-20, doi: 10.1109/ RELAW.2013.6671341. (Year: 2013).*

* cited by examiner

*Primary Examiner* — James E Richardson

(74) *Attorney, Agent, or Firm* — Esplin & Associates, PC

(57)　　　　ABSTRACT

Methods, systems, and devices for automating compliance control mapping are described. In some implementations, the system may ingest compliance artifacts, including text and images extracted from uploaded files. The ingested compliance artifacts may be analyzed by generating vector embeddings for the extracted text and images. These vector embeddings may be mapped to compliance controls based on predefined criteria, with the compliance controls stored in a knowledge graph database. The mappings between the vector embeddings and the compliance controls may be stored in the knowledge graph database, facilitating efficient retrieval and association of compliance information. Some implementations may enhance the accuracy and efficiency of compliance documentation by leveraging advanced computational techniques and structured data storage.

20 Claims, 8 Drawing Sheets

Artifact Ingestion Component

504

Vector Generation Component

506

Compliance Mapping Component

508

Mapping Storage Component

510

Metadata Extraction Component

512

Template Generation Component

514

Evidence Retrieval Component

516

Vector Conversion Component

518

User Interface Component

520

502

500

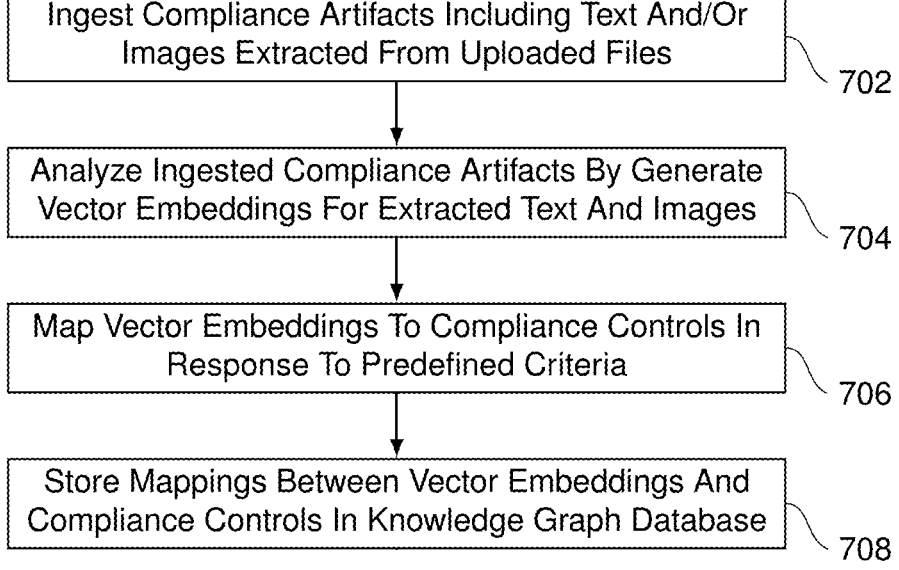

Ingest Compliance Artifacts Including Text And/Or
Images Extracted From Uploaded Files
702

Analyze Ingested Compliance Artifacts By Generate
Vector Embeddings For Extracted Text And Images
704

Map Vector Embeddings To Compliance Controls In
Response To Predefined Criteria
706

Store Mappings Between Vector Embeddings And
Compliance Controls In Knowledge Graph Database
708

FIG. 7       700

AUTOMATING COMPLIANCE CONTROL MAPPING WITH AI AND LLMS

FIELD OF TECHNOLOGY

The present disclosure relates generally to database systems and data processing, and more specifically to automating compliance control mapping with artificial intelligence (AI) and large language models (LLMs).

BACKGROUND

Regulatory compliance frameworks in the field of information security may require organizations to adhere to specific controls and provide detailed documentation to demonstrate compliance. These frameworks may include extensive requirements for managing and documenting security measures, such as access control, data protection, and system monitoring. Organizations may need to analyze and map various types of compliance artifacts, including policies, configurations, scripts, and other system documentation.

SUMMARY

The described techniques relate to improved methods, systems, devices, and apparatuses that support techniques for automating compliance control mapping with AI and LLMs. Some implementations may provide a system that leverages AI and LLMs to automate the mapping of compliance artifacts to specific regulatory controls. The system may ingest compliance artifacts, including documents, spreadsheets, code files, and presentations, and may process every line of text and image to extract relevant information. Using predefined mapping criteria and evaluation instructions, the system may employ LLMs to analyze the extracted data and generate mappings to applicable controls. These mappings may be stored in a knowledge graph database, which may maintain traceability between the artifacts and the controls. The knowledge graph databased may be within a retrieval-augmented generation (RAG) architecture that enables continuous compliance monitoring and real-time control validation.

To enhance efficiency, the system may convert extracted data into vector embeddings, enabling similarity searches for rapid retrieval of relevant information. The system may dynamically compile compliance documentation, including framework-specific templates such as system security plans, and may provide proprietary templates for frameworks without standardized formats. Secure application programming interface (API) integration may allow the system to collect additional evidence from external tools and environments, ensuring comprehensive compliance evaluation. The system may continuously monitor configurations and code repositories through secure API integrations to detect compliance drift and automatically update the mappings in real-time. Designed for flexibility, the system may support deployment with various LLMs, including smaller models optimized for specific environments, making it suitable for government and enterprise use. Some implementations may streamline compliance processes, reduce human error, and provide scalable support for large datasets and complex regulatory frameworks.

A method for automating compliance control mapping is described. The method may include ingesting compliance artifacts, the compliance artifacts including text and/or images extracted from uploaded files. The method may include analyzing the ingested compliance artifacts by generating vector embeddings for the extracted text and images. The method may include mapping the vector embeddings to compliance controls in response to predefined criteria, the compliance controls stored in a knowledge graph database. The method may include storing the mappings between the vector embeddings and the compliance controls in the knowledge graph database.

A system configured for automating compliance control mapping is described. The system may include a processor and memory coupled with the processor. The memory may store instructions executable by the processor to cause the system to ingest compliance artifacts, where the compliance artifacts may include text and/or images extracted from uploaded files. The system may analyze the ingested compliance artifacts by generating vector embeddings for the extracted text and images. The system may map the vector embeddings to compliance controls in response to predefined criteria, where the compliance controls may be stored in a knowledge graph database. The system may store the mappings between the vector embeddings and the compliance controls in the knowledge graph database.

Another system for automating compliance control mapping is described. The system may include means for ingesting compliance artifacts, the compliance artifacts including text and/or images extracted from uploaded files. The system may include means for analyzing the ingested compliance artifacts by generating vector embeddings for the extracted text and images. The system may include means for mapping the vector embeddings to compliance controls in response to predefined criteria, the compliance controls being stored in a knowledge graph database. The system may include means for storing the mappings between the vector embeddings and the compliance controls in the knowledge graph database.

A non-transitory computer-readable medium storing code for automating compliance control mapping is described. The code may include instructions executable by a processor to ingest compliance artifacts, the compliance artifacts including text and/or images extracted from uploaded files. The code may include instructions executable by a processor to analyze the ingested compliance artifacts by generating vector embeddings for the extracted text and images. The code may include instructions executable by a processor to map the vector embeddings to compliance controls in response to predefined criteria, the compliance controls stored in a knowledge graph database. The code may include instructions executable by a processor to store the mappings between the vector embeddings and the compliance controls in the knowledge graph database.

Some examples of the method, systems, and non-transitory computer-readable medium described herein may further include operations, features, means, or instructions for extracting metadata from the ingested compliance artifacts. The metadata may include file type, creation date, and author information, and the metadata may be associated with the vector embeddings stored in the knowledge graph database.

Some examples of the method, systems, and non-transitory computer-readable medium described herein may further include operations, features, means, or instructions for generating compliance documentation templates based on the mappings stored in the knowledge graph database. The templates may be tailored to specific compliance frameworks selected by a user.

Some examples of the method, systems, and non-transitory computer-readable medium described herein may further include operations, features, means, or instructions for retrieving additional evidence from external systems through secure API integration interfaces. The evidence may include configuration files, runtime logs, and code repositories, and the evidence may be associated with the compliance controls in the knowledge graph database.

Some examples of the method, systems, and non-transitory computer-readable medium described herein may further include operations, features, means, or instructions for converting the mappings stored in the knowledge graph database into vector representations. The vector representations may enable similarity searches to identify related compliance controls across multiple compliance frameworks.

Some examples of the method, systems, and non-transitory computer-readable medium described herein may further include operations, features, means, or instructions for integrating directly with development repositories (e.g., GitHub, GitLab, etc.) and cloud service providers (e.g., AWS, Azure, GCP, etc.) through secure API connections to enable continuous monitoring of code commits, pull requests, and infrastructure changes that may impact compliance status.

Some examples of the method, systems, and non-transitory computer-readable medium described herein may further include operations, features, means, or instructions for deploying across multiple security environments (e.g., multi-tenant SaaS, on-premise installations, etc.) and/or classified environments (e.g., those supporting DoD Impact Levels IL2 through IL7).

Some examples of the method, systems, and non-transitory computer-readable medium described herein may further include operations, features, means, or instructions for providing a user interface for uploading compliance artifacts. The user interface may be configured to display mapping results and generate reports based on the mappings stored in the knowledge graph database.

In some examples of the method, systems, and non-transitory computer-readable medium described herein, the vector embeddings may be generated in response to predefined criteria that include keyword identification and contextual analysis of the extracted text and images.

In some examples of the method, systems, and non-transitory computer-readable medium described herein, the knowledge graph database may be updated in response to changes in compliance frameworks, ensuring the mappings reflect current regulatory standards.

In some examples of the method, systems, and non-transitory computer-readable medium described herein, the user interface may provide options for selecting compliance frameworks, enabling customization of mapping processes according to user preferences.

In some examples of the method, systems, and non-transitory computer-readable medium described herein, the secure API integration interfaces may facilitate data exchange with external systems, enhancing the evidence collection process for compliance evaluation.

In some examples of the method, systems, and non-transitory computer-readable medium described herein, the system may generate alerts in response to discrepancies between the ingested compliance artifacts and the compliance controls stored in the knowledge graph database.

BRIEF DESCRIPTION OF THE DRAWINGS

FIGS. 7 and 8 show flowcharts illustrating methods that support automating compliance control mapping with AI and LLMs in accordance with various aspects of the present disclosure.

DETAILED DESCRIPTION

Figure 1:
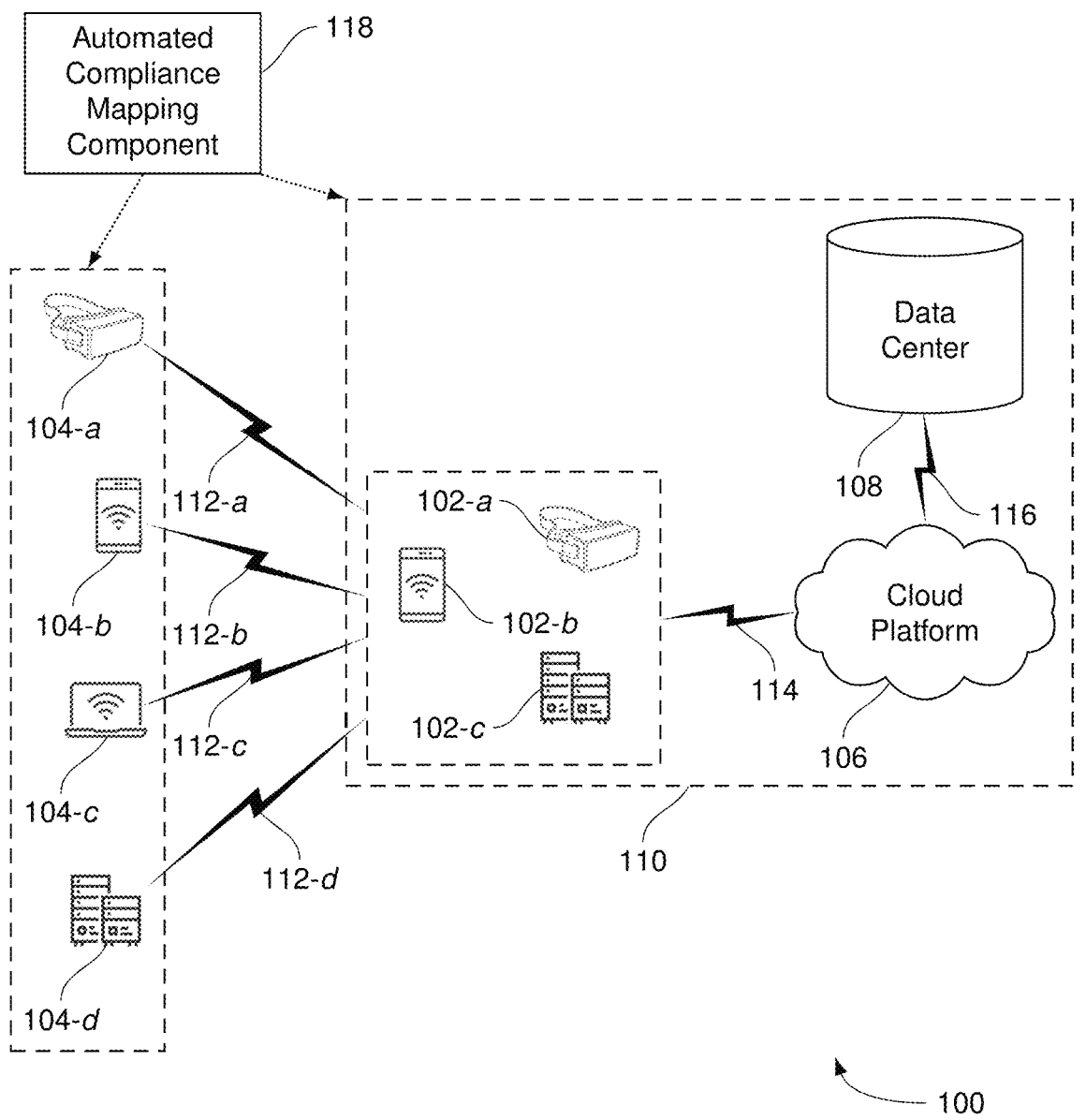
FIG. 1 illustrates an example of a system for data processing that supports automating compliance control mapping with AI and LLMs in accordance with aspects of the present disclosure.

Methods, systems, devices, and apparatuses that support techniques for automating compliance control mapping with AI and LLMs are disclosed. In some examples, the manual mapping of compliance artifacts to regulatory controls may present significant challenges for organizations. This process may require extensive human effort to review and analyze large volumes of documentation, including text and images, to identify relevant compliance controls. The complexity of modern information technology systems, combined with the sheer number of controls in frameworks, may exacerbate the difficulty of maintaining accurate and up-to-date compliance documentation. Human error may further increase the risk of incomplete or incorrect mappings, which can lead to compliance gaps and potential regulatory penalties. Existing automated solutions may lack the ability to efficiently process diverse file types, extract relevant information, and dynamically adapt to different compliance frameworks, leaving organizations with inadequate tools to address these challenges.

According to some implementations, a system may use AI-generated mappings in conjunction with LLMs to automatically associate compliance artifacts and system information with specific compliance controls. The system may process every line of text and all images from uploaded compliance artifacts to identify relevant information for mapping, completing the process within approximately one minute.

Some implementations may include modules for ingesting and processing compliance artifacts from diverse sources including software bills of materials (SBOMs), security information and event management (SIEM) logs, cloud configurations, source code repositories, system documentation, and/or other sources. These modules may extract all text and images from the uploaded files, ensuring that no relevant information is overlooked. Specific portions of the artifacts, such as a single slide in a large presentation or a specific paragraph in a lengthy document, may be identified and processed, while irrelevant content may be excluded. According to some implementations, every line of text and all images may be processed within approximately one minute to generate comprehensive compliance mappings that enable ATO-ready documentation in as little as 15 minutes.

A knowledge graph database may be used in some implementations to store and manage mappings between compliance artifacts and controls. This database may be pre-populated with mappings derived from compliance frameworks, such as security and regulatory standards. Predefined criteria and evaluation instructions may guide the generation of these mappings to ensure consistency and accuracy.

Some implementations may include predefined source control mapping criteria to guide LLMs in identifying relevant information within the artifacts. These criteria may include specific keywords and contextual instructions that help the models understand what to look for in the artifacts. This process may ensure that relevant information is associated with the appropriate compliance controls.

Implementation evaluation criteria may be included in some implementations to provide detailed instructions for LLMs to evaluate compliance controls. These criteria may be dynamically incorporated into prompts sent to the models, tailoring the evaluation process to the specific requirements of each control. The criteria may mimic the thought process of a human reviewer, identifying relevant elements such as password management scripts or authentication functions.

Dynamic prompt generation may be used in some implementations to combine implementation evaluation criteria, source control mapping criteria, and specific data from the uploaded artifacts. These prompts may provide the models with all necessary context and instructions for accurate mapping and evaluation. Detailed prompts may allow the system to utilize smaller, more efficient models, reducing computational requirements.

Some implementations may convert every piece of data from compliance artifacts into vector embeddings, which may be stored in a data storage system. These vector embeddings may enable similarity searches, allowing the system to quickly retrieve relevant information during the mapping process. Retrieval-augmented generation may be supported, where relevant data may be retrieved and integrated to enhance the output of the models.

A user interface may be included in some implementations to allow users to upload compliance artifacts for processing. Users may select specific compliance frameworks and request the generation of framework-specific templates, such as security plans. Dynamically compiled reports based on the processed artifacts may be provided through the interface.

Some implementations may support the generation of standard templates for specific compliance frameworks, such as predefined security plan templates. For frameworks without standard templates, proprietary templates may be provided to ensure consistent and comprehensive reporting. These templates may be populated with relevant information extracted from the artifacts.

Secure API integration may be included in some implementations to allow the system to connect with external tools and environments, such as code repositories and configuration management systems. This integration may enable the collection of additional evidence and data for compliance evaluation. Secure network infrastructure may ensure that sensitive information is protected during data transfer and processing.

Flexibility in the selection of LLMs may be supported in some implementations, allowing different models to be used based on deployment requirements. Smaller models may be used when detailed instructions and context are provided, reducing dependency on larger models. This flexibility may be particularly beneficial for environments with specific accreditation requirements for the models used.

Some implementations may support multiple compliance frameworks, including security and regulatory standards. Mappings for various frameworks may be included, ensuring adaptability to different compliance requirements. New frameworks may be dynamically supported by generating mappings and evaluation criteria as needed.

An assessment module may be included in some implementations to compile all relevant information into comprehensive compliance documentation. Users may request specific compliance documents, such as security plans, which may be generated based on the processed artifacts and mappings. The module may prepare documentation in a format suitable for submission to auditors.

Retrieval-augmented generation may be incorporated into some implementations to enhance the ability of LLMs to answer questions and generate outputs. When a query is made, relevant vector embeddings may be retrieved, and the associated data may be integrated into the response. This feature may ensure accurate and contextually relevant answers.

Traceability between compliance artifacts and controls may be maintained in some implementations, ensuring that all mappings are well-documented. Specific portions of the artifacts relevant to each control may be identified and highlighted, providing clear evidence for compliance. This may simplify the process of submitting documentation to auditors.

Some implementations may be designed to handle large datasets and complex compliance frameworks, ensuring scalability for organizations of various sizes. The use of vector embeddings and efficient models may allow rapid and accurate processing of data, even in resource-constrained environments. High-performance computing servers or cloud infrastructure may support scalability.

Knowledge graph updates for new compliance frameworks may be supported in some implementations. This process may involve creating an initial mapping table and using system functions to generate the required prompts and criteria. Testing and evaluation may ensure that the new mappings meet quality standards.

Chatbot functionality may be supported in some implementations by leveraging vector embeddings for retrieval tasks. The chatbot may use similarity searches to identify and retrieve relevant information from stored embeddings, enabling users to interact with the system in a conversational manner.

Some implementations may be designed to meet the requirements of sensitive environments, such as government deployments. Accredited models and secure infrastructure may be supported to comply with specific regulatory and security standards. Flexibility may ensure adaptability to the unique needs of these environments.

Proprietary reporting templates may be included in some implementations for compliance domains without standard templates. These templates may provide a consistent and professional format for presenting compliance information. Data from processed artifacts may be dynamically populated into the templates.

Efficient use of smaller LLMs may be supported in some implementations by providing detailed prompts and context. This approach may reduce computational requirements and allow operation in resource-constrained environments.

Smaller models may achieve high accuracy by leveraging the provided instructions and data.

End-to-end automation may be included in some implementations to streamline the process of compliance mapping, from artifact ingestion to documentation generation. Manual review may be eliminated, reducing the risk of human error and ensuring consistent results. Automation may simplify compliance workflows and save time and resources.

Some implementations may support multi-tenant SaaS deployment in FedRAMP High authorized environments. Some implementations may support On-premise deployment for air-gapped and classified networks. Some implementations may support hybrid deployments spanning multiple security domains.

Some implementations may include an ensemble of LLMs in a mixture of experts (MoE) architecture to analyze the extracted data and generate mappings to applicable controls, utilizing fine-tuned embedding models and dynamic prompt generation tailored to specific compliance frameworks.

Aspects of the subject matter described in this disclosure can be implemented to realize one or more of the following potential advantages. The described techniques may be implemented to support streamlined compliance workflows by enabling automated identification and mapping of relevant information from diverse artifacts to specific controls. The system may enhance operational efficiency by reducing the time required for compliance documentation generation while maintaining accuracy and traceability. The use of vector embeddings may facilitate rapid retrieval of relevant data, ensuring that compliance evaluations are both thorough and contextually appropriate. Dynamic prompt generation may allow the system to adapt to varying compliance frameworks, providing tailored instructions for evaluating controls based on specific requirements. Secure integration capabilities may ensure that sensitive data is handled with appropriate safeguards, supporting environments with stringent security standards. The flexibility to utilize smaller models may reduce computational overhead, making the system suitable for deployment in resource-constrained settings.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to automating compliance control mapping with AI and LLMs.

FIG. 1 illustrates an example of a system 100 that supports automating compliance control mapping with AI and LLMs in accordance with various aspects of the present disclosure. The system 100 includes cloud clients 102, user devices 104, a cloud platform 106, and a data center 108. Cloud platform 106 may be an example of a public or private cloud network, such as a secure SaaS environment for compliance automation. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a server (e.g., cloud client 102-a), a smartphone (e.g., cloud client 102-b), or a laptop (e.g., cloud client 102-c). In other examples, a cloud client 102 may be a desktop computer, a tablet, a sensor, or another computing device or system capable of generating, analyzing, transmitting, or receiving communications. In some examples, a cloud client 102 may be part of a business, an enterprise, a non-profit, a startup, or any other organization type, such as a government agency or defense contractor seeking to automate compliance processes.

A cloud client 102 may facilitate communication between the data center 108 and one or multiple user devices 104 to implement an online environment for compliance management and automation. The network connection 112 may include communications, opportunities, purchases, sales, or any other interaction between a cloud client 102 and a user device 104, such as uploading compliance artifacts, reviewing compliance status, or collaborating on remediation actions. The network connection 112 may include a wired connection, a wireless connection, or both. A cloud client 102 may access cloud platform 106 to store, manage, and process the data communicated via one or more network connections 112, including compliance documentation, system security plans, and evidence artifacts. In some cases, the cloud client 102 may have an associated security or permission level, such as a role-based access control for compliance data. A cloud client 102 may have access to certain applications, data, and database information within cloud platform 106 based on the associated security or permission level, and may not have access to others.

The user device 104 may include an automated compliance mapping component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-a, 112-b, 112-c, and 112-d) via a computer network. In an example, the user device 104 may be a computing device such as a wearable device 104-a, a smartphone 104-b, a laptop 104-c, or a server 104-d. In other cases, the user device 104 may be another computing system. In some cases, the user device 104 may be operated by a user or group of users. The user or group of users may be a customer, associated with a business, a manufacturer, or any other appropriate organization, such as a compliance officer, auditor, or IT administrator.

Cloud platform 106 may offer an on-demand database service to the cloud client 102, such as a compliance automation platform that ingests, analyzes, and manages compliance data and artifacts. In some cases, cloud platform 106 may be an example of a multi-tenant database system. In this case, cloud platform 106 may serve multiple cloud clients 102 with a single instance of software, supporting multiple organizations' compliance needs in a secure and isolated manner. However, other types of systems may be implemented, including—but not limited to—client-server systems, mobile device systems, and mobile network systems. In some cases, cloud platform 106 may support an online application. This may include support for compliance assessments, evidence management, automated document generation, remediation tracking, analytics, and integration with DevOps and security tools. Cloud platform 106 may receive data associated with generation of an online environment from the cloud client 102 over network connection 114, and may store and analyze the data, such as compliance artifacts, system configurations, and audit logs. In some cases, cloud platform 106 may receive data directly from a user device 104 and the cloud client 102. In some cases, the cloud client 102 may develop applications to run on cloud platform 106, such as custom compliance workflows or integrations. Cloud platform 106 may be implemented using remote servers. In some cases, the remote servers may be located at one or more data centers 108.

Data center 108 may include multiple servers. The multiple servers may be used for data storage, management, and processing, such as storing compliance evidence, running AI models for compliance mapping, and maintaining audit trails. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes, such as encrypted backups and failover systems. In some cases, the data stored at data center 108 may be backed up by copies of the data at a different data center (not pictured).

Server system 110 may include cloud clients 102, a cloud platform 106, an automated compliance mapping component 118, and a data center 108 that may coordinate with cloud platform 106 and data center 108 to implement an online environment for compliance automation and management. In some cases, data processing may occur at any of the components of server system 110, or at a combination of these components. Thus, the automated compliance mapping component 118 may be included in the user device 104, server system 110, or in part or in whole in both. In some cases, servers may perform the data processing. The servers may be a cloud client 102 or located at data center 108.

Some or all of the functionality attributed to the automated compliance mapping component 118 may be embodied or performed by one or more user devices 104, one or more components of server system 110 (e.g., cloud clients 102, a cloud platform 106, and/or a data center 108), and/or other components of system 100. The automated compliance mapping component 118 may receive signals and inputs from user device 104 directly, via cloud clients 102, and/or via cloud platform 106 or data center 116.

As described herein, the automated compliance mapping component 118 may ingest compliance artifacts, including text and/or images extracted from uploaded files, from user devices 110 or cloud clients 102. The component may analyze the ingested artifacts by generating vector embeddings for the extracted text and images, which may then be mapped to compliance controls stored in a knowledge graph database based on predefined criteria. The mappings may be stored in the knowledge graph database, which may reside within the cloud platform 106 or data center 108. The automated compliance mapping component 118 may facilitate efficient processing and association of compliance artifacts with relevant compliance controls, enabling seamless integration across system 100 components.

According to some implementations, open security controls assessment language (OSCAL) may provide a standardized, machine-readable format for expressing security and privacy control information. OSCAL may enable the automation of compliance processes by structuring documentation in data-centric formats such as XML, JSON, and YAML, thereby replacing traditional Word or Excel-based workflows. Through its extensible design, OSCAL may facilitate interoperability among compliance tools and systems, allowing organizations to share, validate, and maintain control implementations with increased consistency. OSCAL-formatted artifacts may further enable programmatic generation of system security plans (SSPs), continuous control assessments, and streamlined evidence collection, which may reduce the overall audit burden.

Some implementations may support compliance document generation, control mapping, or audit readiness within a constrained processing time, such as fifteen minutes. This performance metric may depend on the scope and complexity of the inputs, the nature of the integrated DevSecOps tools, and the degree of automation applied in the transformation of raw data into compliance-ready formats. Some implementations may incorporate parallel data pipelines, caching mechanisms, and real-time ingestion from source systems to support such rapid processing. While time-to-output may vary across use cases, achieving compliance processing within a short, repeatable time window may be a design goal.

Some implementations may incorporate a conversational AI interface to facilitate human-in-the-loop interactions. Some implementations may utilize natural language understanding to interpret user queries, provide contextual explanations of security controls, and guide remediation workflows. Some implementations interface with compliance artifacts and knowledge graphs to provide traceable answers and automate the generation or refinement of documentation based on user input. A chat-based interface may allow non-experts to interact with complex compliance requirements in an accessible and intuitive manner, thereby lowering barriers to adoption and increasing system usability.

Some implementations may provide POA&M management to centralize the tracking of identified compliance gaps, assigned remediations, and resolution timelines. This may interface with real-time monitoring systems and security assessments to auto-populate deficiencies and associate them with responsible stakeholders. Some implementations may apply prioritization heuristics or AI-based risk scoring to triage open issues. Audit history and control implementation data may be used to generate dynamically updated POA&M reports that reflect the current posture relative to required compliance frameworks.

Some implementations may incorporate continuous monitoring capabilities that ingest telemetry data from integrated DevOps and security tooling to assess control efficacy in real-time. Some implementations may normalize and map collected data to relevant control frameworks (e.g., NIST 800-53, CMMC), evaluate changes against compliance baselines, and trigger alerts or POA&M updates upon deviations. Such monitoring may support automated evidence collection and version control, ensuring audit readiness at all times. The monitoring engine may be configurable to support both periodic polling and event-driven ingestion patterns.

Some implementations may implement audit analysis functionality based on assessment procedures described in NIST SP 800-53A. These procedures may be codified into executable rule sets or workflows that evaluate control implementation details against defined objectives, thereby supporting risk-informed decision-making. Some implementations may allow tailoring of these procedures based on organizational context, system boundary definitions, and control inheritance models. Furthermore, integration with machine-readable standards such as OSCAL may allow for automatic generation of assessment plans and structured evaluation of test results in alignment with NIST guidance.

Some implementations may incorporate a mixture of experts (MoE) machine learning model architecture to dynamically route tasks to specialized AI sub-models. In such an architecture, each expert model may be trained to perform optimally over a particular subset of compliance-related tasks, such as control mapping, evidence generation, risk scoring, or remediation recommendation. A gating function may evaluate the input context and determine a weighted selection of one or more experts to produce the output. This architecture may enhance scalability and specialization across domains (e.g., cloud security vs. physical safeguards), while reducing compute costs by limiting inference to only a sparse subset of models. The MoE approach may also improve model performance by enabling expert specialization and continual learning across diverse regulatory regimes.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
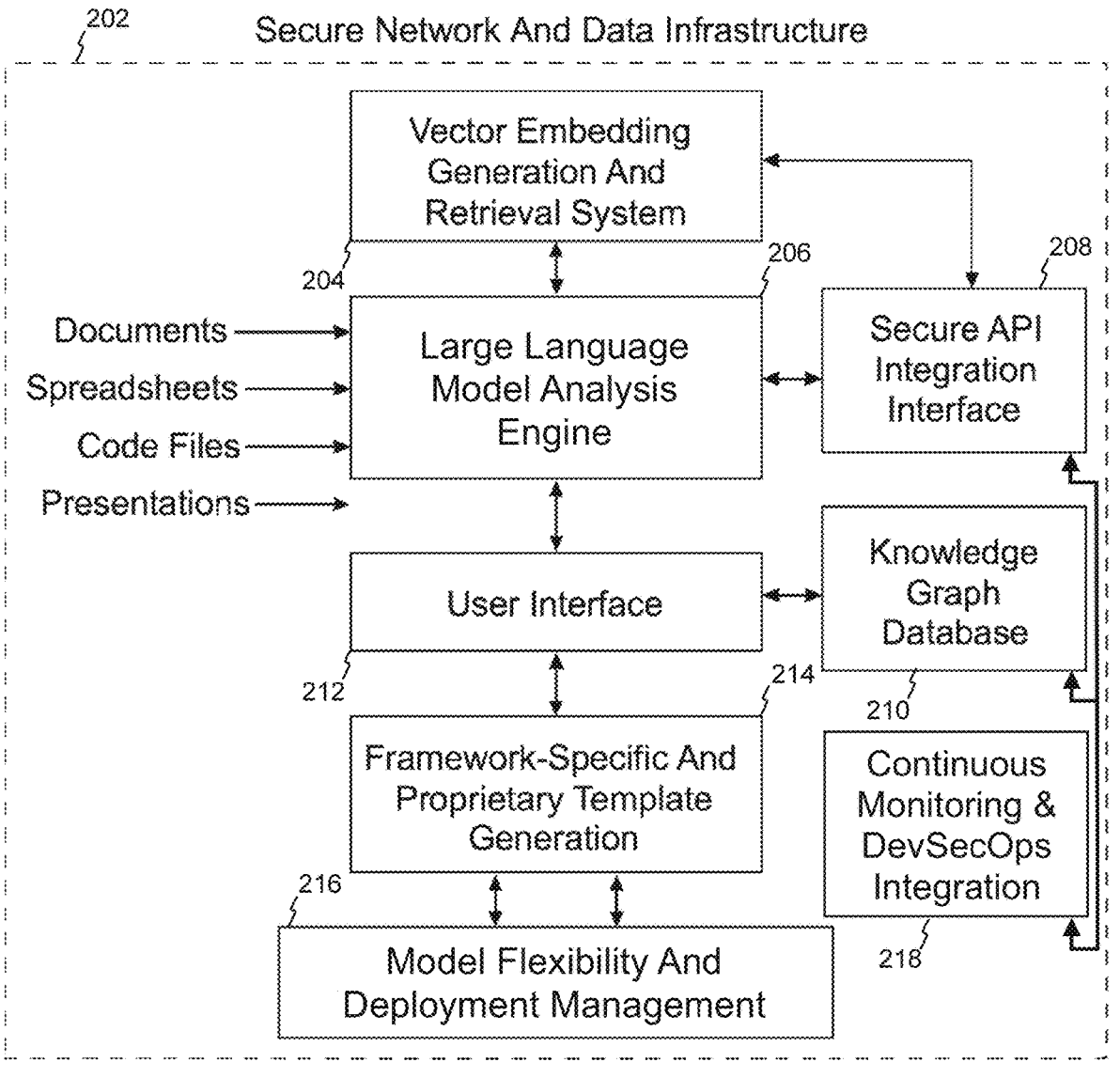
FIG. 2 shows block diagram which supports techniques for automating compliance control mapping with AI and LLMs in accordance with various aspects of the present disclosure.

FIG. 2 shows block diagram 200 which supports techniques for automating compliance control mapping with AI and LLMs in accordance with various aspects of the present disclosure. As depicted in FIG. 2, the block diagram 200 may include one or more of a secure network and data infrastructure 202, a vector embedding generation and retrieval system 204, a LLM analysis engine 206, a secure API integration interface 208, a knowledge graph database 210, a user interface 212, a framework-specific and proprietary template generation 214, a model flexibility and deployment management 216, a continuous monitoring and DevSecOps integration 218, and/or other components.

The secure network and data infrastructure 202 may include systems for protecting sensitive information during processing and storage. In some implementations, the secure network and data infrastructure 202 may include encryption protocols to safeguard data during transmission and storage. The secure network and data infrastructure 202 may incorporate firewalls and intrusion detection systems to monitor and control access to sensitive information. The secure network and data infrastructure 202 may interact with the secure API integration interface 208 to ensure that data collected from external tools is transmitted securely. In some implementations, alternative configurations may include private cloud environments or on-premises servers to meet specific security requirements.

The vector embedding generation and retrieval system 204 may represent a mechanism for converting data into vector representations to facilitate similarity searches. In some implementations, the vector embedding generation and retrieval system 204 may process text and images extracted from compliance artifacts to create vector maps. The vector embedding generation and retrieval system 204 may determine relationships between data points by performing similarity searches across the vector embeddings. The vector embedding generation and retrieval system 204 may interact with the LLM analysis engine 206 to retrieve relevant data for control mappings. In some implementations, alternative approaches may include the use of pretrained embedding models or custom-built embedding algorithms.

The LLM analysis engine 206 may provide capabilities for analyzing compliance artifacts and generating mappings to relevant controls. In some implementations, the LLM analysis engine 206 may analyze uploaded documents, spreadsheets, and code files to identify compliance-related information. The LLM analysis engine 206 may determine mappings by evaluating extracted data against predefined criteria stored in the knowledge graph database 210. The LLM analysis engine 206 may interact with the vector embedding generation and retrieval system 204 to enhance the accuracy of its analysis. In some implementations, alternative configurations may include smaller language models tailored to specific compliance frameworks.

The secure API integration interface 208 may offer connections to external tools and environments for collecting additional evidence and data. In some implementations, the secure API integration interface 208 may connect to code repositories, configuration management systems, and run-time environments to gather compliance-related information. The secure API integration interface 208 may determine the relevance of collected data by integrating it with the knowledge graph database 210. The secure API integration interface 208 may interact with the secure network and data infrastructure 202 to ensure secure data transfer during evidence collection. In some implementations, alternative configurations may include custom-built APIs or third-party integration tools.

The knowledge graph database 210 may store and manage mappings between compliance artifacts and controls, pre-populated with compliance framework data. In some implementations, the knowledge graph database 210 may organize mappings derived from frameworks such as NIST 800-53 and FedRAMP. The knowledge graph database 210 may determine relationships between compliance artifacts and controls by referencing predefined mapping criteria. The knowledge graph database 210 may interact with the LLM analysis engine 206 to update mappings based on new compliance artifacts. In some implementations, alternative configurations may include relational databases or graph-based storage systems.

The user interface 212 may allow users to upload compliance artifacts and generate reports based on selected frameworks. In some implementations, the user interface 212 may accept various file types, including PowerPoint presentations and code files, for compliance analysis. The user interface 212 may determine the appropriate framework-specific templates by referencing the framework-specific and proprietary template generation 214. The user interface 212 may interact with the secure API integration interface 208 to collect additional evidence for compliance evaluation. In some implementations, alternative designs may include web-based dashboards or mobile applications.

The framework-specific and proprietary template generation 214 may create documentation templates tailored to specific compliance frameworks. In some implementations, the framework-specific and proprietary template generation 214 may generate templates for frameworks such as FedRAMP and ISO 27001. The framework-specific and proprietary template generation 214 may determine the content of the templates by referencing mappings stored in the knowledge graph database 210. The framework-specific and proprietary template generation 214 may interact with the user interface 212 to allow users to select and download generated templates. In some implementations, alternative configurations may include customizable templates or industry-specific reporting formats.

The model flexibility and deployment management 216 may support the use of different LLMs based on deployment requirements. In some implementations, the model flexibility and deployment management 216 may allow the use of smaller models when detailed instructions are provided to reduce computational requirements. The model flexibility and deployment management 216 may determine the appropriate model by referencing accreditation requirements for government customers. The model flexibility and deployment management 216 may interact with the LLM analysis engine 206 to ensure compatibility with selected models. In some implementations, alternative configurations may include hybrid models or region-specific deployment options.

The continuous monitoring and DevSecOps integration 218 may support real-time ingestion and analysis of compliance-related data from software development and operational environments. In some implementations, the continuous monitoring and DevSecOps integration 218 may connect to CI/CD pipelines, infrastructure-as-code platforms, and security tooling to collect logs, scan results, and configuration states. The continuous monitoring and DevSecOps integration 218 may interact with the secure API integration interface 208 to securely retrieve this information, and may pass relevant data to the knowledge graph database 210 for mapping to applicable controls. This integration may enable the system to detect compliance drift, automatically update evidence records, and maintain an up-to-date view of the system's security posture. In some implementations, alternative configurations may include agent-based data collection or webhook-driven event ingestion.

In some implementations, the secure network and data infrastructure 202 may encompass the entire system, ensuring that data transfer and model deployment occur within a protected environment. The vector embedding generation and retrieval system 204 may interact with the LLM analysis engine 206 to convert compliance artifact data into vector representations, which may then be stored for efficient retrieval during compliance evaluations. The LLM analysis engine 206 may process ingested artifacts and determine relevant mappings to compliance controls, leveraging prompts and contextual instructions.

In some implementations, the secure API integration interface 208 may connect the system to external tools and environments, such as code repositories and runtime environments, to collect additional evidence for compliance evaluation. The knowledge graph database 210 may store mappings between compliance artifacts and controls, allowing traceability and contextual linkage during the analysis process. The user interface 212 may serve as the entry point for users to upload artifacts, select compliance frameworks, and access generated reports. The framework-specific and proprietary template generation 214 may assist users in producing documentation aligned with selected standards, while the model flexibility and deployment management 216 may ensure the appropriate LLMs are used based on deployment context. The continuous monitoring and DevSecOps integration 218 may further enhance the system by enabling real-time data ingestion and ongoing compliance status updates.

In some implementations, the framework-specific and proprietary template generation 214 may dynamically compile relevant information from processed artifacts to create documentation tailored to specific compliance frameworks. The model flexibility and deployment management 216 may allow the system to adapt to different deployment environments by selecting appropriate LLMs based on resource constraints and accreditation requirements.

Figure 3:
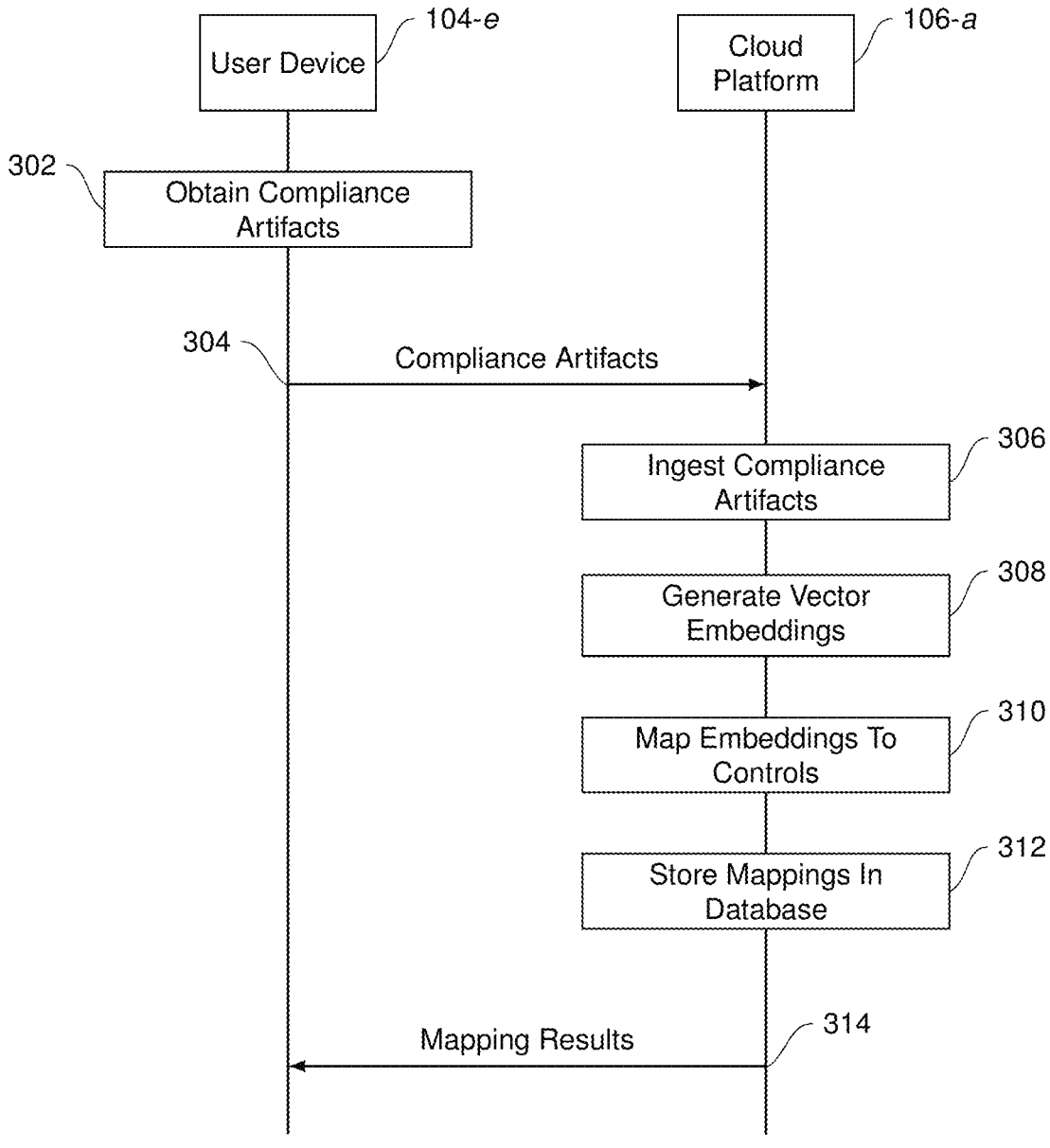
FIG. 3 illustrates an example of a process flow that supports automating compliance control mapping with AI and LLMs in accordance with various aspects of the present disclosure.

FIG. 3 illustrates an example of a process flow 300 that supports automating compliance control mapping with AI and LLMs in accordance with aspects of the present disclosure. In some examples, the process flow 300 may implement aspects of the system 100. For example, the process flow 300 may include a user device 104-e and a cloud platform 106-a, which may be examples of corresponding devices described herein. In some implementations, a user device 104-e uploads files containing compliance artifacts to a cloud platform 106-a, which ingests the artifacts, generates vector embeddings for the extracted text and images, maps the embeddings to compliance controls based on predefined criteria stored in a knowledge graph database, and saves the mappings in the knowledge graph database.

At 302, the user device 104-e may obtain files containing compliance artifacts from a user. For example, the user device 104-e may accept various file types, such as documents, spreadsheets, code files, or PowerPoint presentations, and extract relevant data from these files. In some implementations, the user device 104-e may process a single slide from a multi-slide PowerPoint deck to identify specific compliance-related information. The user device 104-e may handle files containing text, images, or other embedded content to ensure that all relevant data is accessible for subsequent analysis.

At 304, the user device 104-e may transmit the files containing compliance artifacts to the cloud platform 106-a. For example, the user device 104-e may send files containing text extracted from uploaded documents, spreadsheets, or code files to the cloud platform 106-a for further processing. In some implementations, the user device 104-e may transmit vector embeddings generated from the compliance artifacts to the cloud platform 106-a to support similarity searches and retrieval tasks. The user device 104-e may include metadata with the transmitted files to assist the cloud platform 106-a in organizing and analyzing the compliance artifacts.

At 306, the cloud platform 106-a may ingest the compliance artifacts, extracting text and/or images from the uploaded files. For example, the cloud platform 106-a may process compliance artifacts in various formats, such as PowerPoint presentations, spreadsheets, or code files, identifying specific sections or elements relevant to compliance controls. In some implementations, the cloud platform 106-a may extract metadata from the uploaded files to assist in organizing the extracted text and images for subsequent analysis. In other implementations, the cloud platform 106-a may convert the extracted text and images into vector embeddings to support similarity searches and retrieval tasks.

At 308, the cloud platform 106-a may analyze the ingested compliance artifacts by generating vector embeddings for the extracted text and images. For example, the cloud platform 106-a may convert each paragraph from a policy document into a vector representation, which may assist in similarity searches across other compliance artifacts. In some implementations, the cloud platform 106-a may employ retrieval augmented generation techniques, where the vector embeddings may be used to determine the relevance of specific text or images to compliance controls. The cloud platform 106-a may utilize these vector embeddings to support a chat feature, where a chatbot may perform similarity searches to determine the most relevant information for a given query. In other implementations, the cloud platform 106-a may store these vector embeddings in a data storage system, making them accessible for future compliance evaluations or audits.

At 310, the cloud platform 106-a may map the vector embeddings to compliance controls based on predefined criteria, the compliance controls being stored in a knowledge graph database. For example, the cloud platform 106-*a* may use predefined prompts to instruct a LLM (LLM) to evaluate the relevance of vector embeddings to specific compliance controls. In some implementations, the cloud platform 106-*a* may analyze code repositories and cloud configurations through API integrations. In some implementations, the cloud platform 106-*a* may dynamically adjust the predefined criteria based on the specific compliance framework selected by a user, such as FedRAMP or ISO 27001. In other implementations, the cloud platform 106-*a* may reference mappings derived from external compliance standards to refine the association between vector embeddings and compliance controls.

At 312, the cloud platform 106-*a* may store the mappings between the vector embeddings and the compliance controls in the knowledge graph database. For example, the cloud platform 106-*a* may organize the mappings in a hierarchical structure within the knowledge graph database to reflect relationships between compliance controls and associated artifacts. In some implementations, the cloud platform 106-*a* may enable continuous monitoring for real-time compliance validation. In some implementations, the cloud platform 106-*a* may update the knowledge graph database dynamically as new compliance artifacts are processed, ensuring that the mappings remain current. In other implementations, the cloud platform 106-*a* may include metadata with the stored mappings to assist in retrieval tasks during compliance evaluations.

At 314, the cloud platform 106-*a* may transmit the mapping results to the user device 104-*e*. For example, the cloud platform 106-*a* may send the mapping results as part of a structured report that includes references to specific compliance artifacts and their associated controls. In some implementations, the cloud platform 106-*a* may transmit the mapping results in a format compatible with third-party compliance tools, allowing the user device 104-*e* to integrate the results into external systems. In other implementations, the cloud platform 106-*a* may include metadata with the mapping results to assist the user device 104-*e* in organizing and displaying the information.

Figure 4:
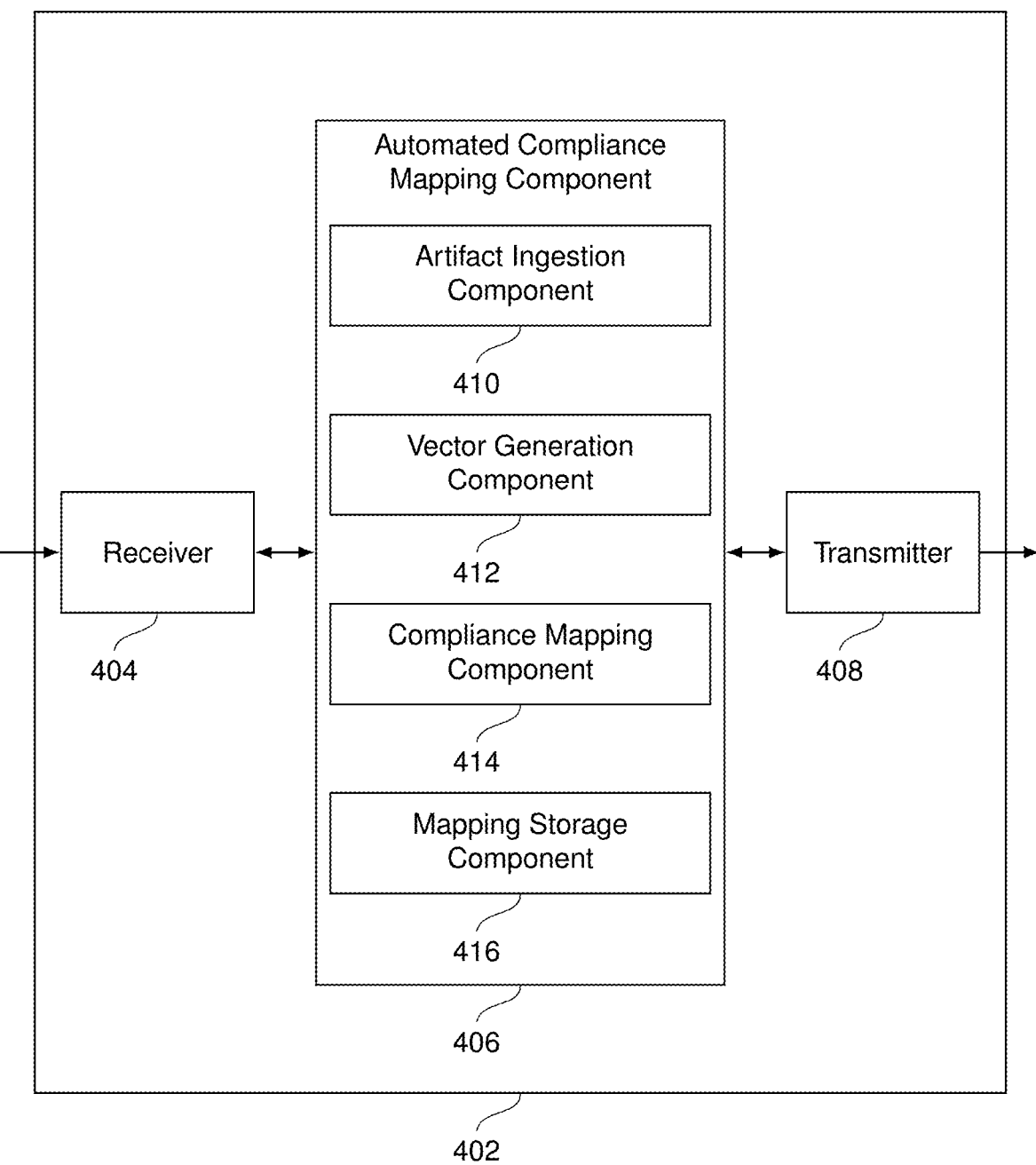
FIG. 4 shows a block diagram of an apparatus that supports automating compliance control mapping with AI and LLMs in accordance with various aspects of the present disclosure.

FIG. 4 shows a block diagram 400 of an apparatus 402 that supports automating compliance control mapping with AI and LLMs in accordance with various aspects of the present disclosure. The apparatus 402 may include an input module 404, automated compliance mapping component 406, and an output module 408. The apparatus 402 may also include a processor. Each of these components may be in communication with one another (e.g., via one or more buses). In some cases, the apparatus 402 may be an example of a user terminal, a database server, or a system containing multiple computing devices.

The input module 404 may manage input signals for the apparatus 402. For example, the input module 404 may identify input signals based on an interaction with a modem, a keyboard, a mouse, a touchscreen, or a similar device. These input signals may be associated with user input or processing at other components or devices. In some cases, the input module 404 may utilize an operating system such as iOS®, ANDROID®, MS-DOS®, MS-WINDOWS®, OS/2®, UNIX®, LINUX®, or another known operating system to handle input signals. The input module 404 may send aspects of these input signals to other components of the apparatus 402 for processing. For example, the input module 404 may transmit input signals to the automated compliance mapping component 406 to support face detection to address privacy in publishing image datasets. In some cases, the input module 404 may be a component of an input/output (I/O) controller 606 as described with reference to FIG. 6.

The automated compliance mapping component 406 may include one or more of an artifact ingestion component 410, a vector generation component 412, a compliance mapping component 414, a mapping storage component 416, and/or other components. The automated compliance mapping component 406 may be an example of aspects of the automated compliance mapping component 502 or 604 described with reference to FIGS. 5 and 6.

The artifact ingestion component 410 may be configured as or otherwise support a means for ingesting compliance artifacts, the compliance artifacts including text and/or images extracted from uploaded files. The vector generation component 412 may be configured as or otherwise support a means for analyzing the ingested compliance artifacts by generating vector embeddings for the extracted text and images. The compliance mapping component 414 may be configured as or otherwise support a means for mapping the vector embeddings to compliance controls in response to predefined criteria, the compliance controls stored in a knowledge graph database. The mapping storage component 416 may be configured as or otherwise support a means for storing the mappings between the vector embeddings and the compliance controls in the knowledge graph database.

The output module 408 may manage output signals for the apparatus 402. For example, the output module 408 may receive signals from other components of the apparatus 402, such as the automated compliance mapping component 406, and may transmit these signals to other components or devices. In some specific examples, the output module 408 may transmit output signals for display in a user interface, for storage in a database or data store, for further processing at a server or server cluster, or for any other processes at any number of devices or systems. In some cases, the output module 408 may be a component of an I/O controller 606 as described with reference to FIG. 6.

Figure 5:
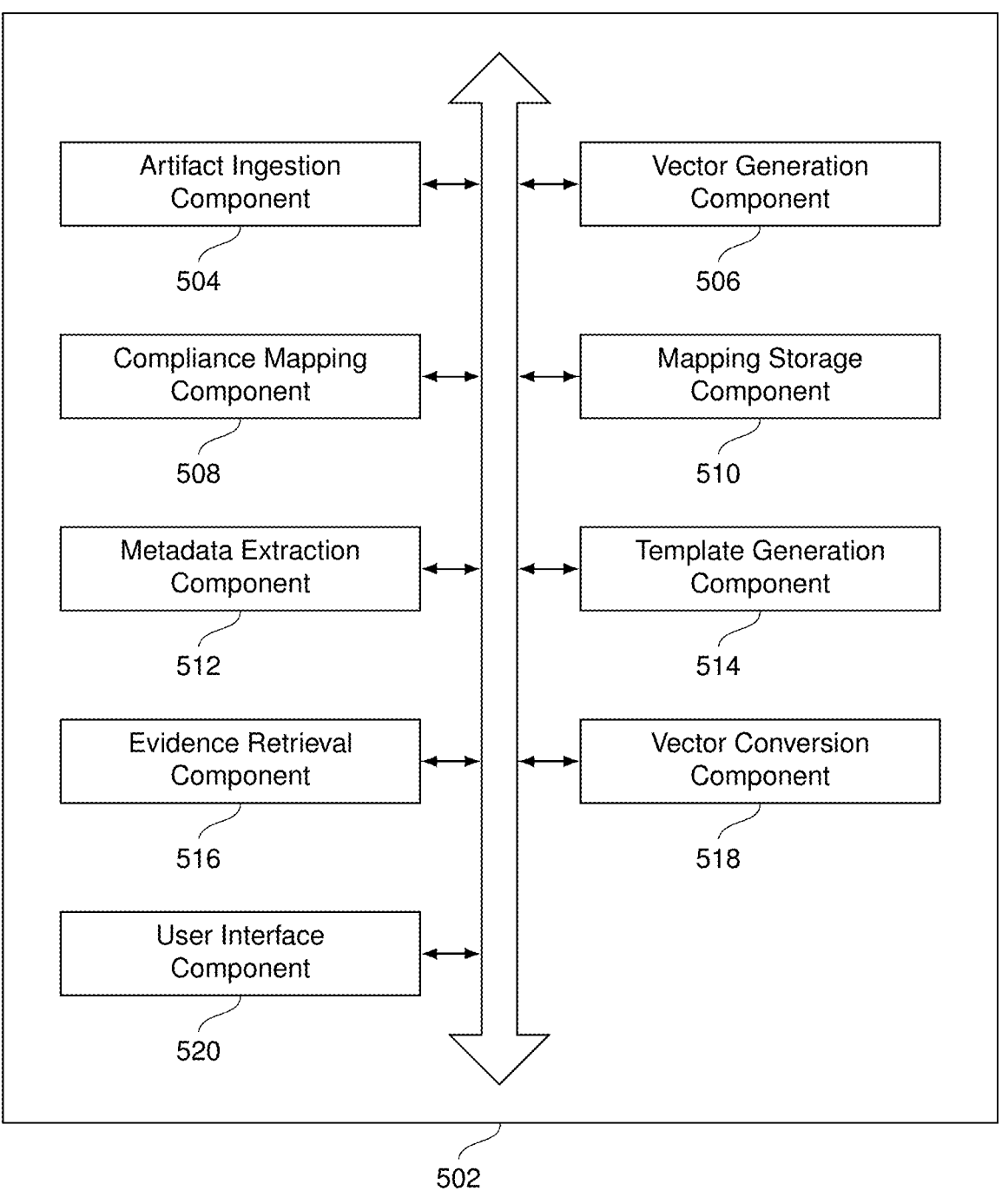
FIG. 5 shows a block diagram of an automated compliance mapping component that supports automating compliance control mapping with AI and LLMs in accordance with various aspects of the present disclosure.

FIG. 5 shows a block diagram 500 of an automated compliance mapping component 502 that supports automating compliance control mapping with AI and LLMs in accordance with various aspects of the present disclosure. The automated compliance mapping component 502 may be an example of aspects of an automated compliance mapping component 406, an automated compliance mapping component 604, or both, as described herein. The automated compliance mapping component 502, or various components thereof, may be an example of means for performing various aspects of automating compliance control mapping with AI and LLMs as described herein. For example, the automated compliance mapping component 502 may include one or more of an artifact ingestion component 504, a vector generation component 506, a compliance mapping component 508, a mapping storage component 510, a metadata extraction component 512, a template generation component 514, an evidence retrieval component 516, a vector conversion component 518, a user interface component 520, and/or other components. Each of these components may communicate, directly or indirectly, with one another (e.g., via one or more buses).

The artifact ingestion component 504 may be configured as or otherwise support a means for ingesting compliance artifacts, the compliance artifacts including text and/or images extracted from uploaded files. In some implementations, the artifact ingestion component 504 may accept a wide range of file types, such as PowerPoint presentations, spreadsheets, and code files, to accommodate diverse compliance documentation formats. In some implementations, the artifact ingestion component 504 may process multipage documents to identify specific sections containing relevant compliance information, such as paragraphs addressing access control or password management. In some implementations, the artifact ingestion component 504 may extract embedded metadata from uploaded files, which may include timestamps, authorship details, or version history for compliance tracking.

The vector generation component 506 may be configured as or otherwise support a means for analyzing the ingested compliance artifacts by generating vector embeddings for the extracted text and images. In some implementations, the vector generation component 506 may determine vector representations for individual sentences within a document to enable granular analysis of compliance-related content. In some implementations, the vector generation component 506 may process images by converting visual elements, such as diagrams or charts, into vector embeddings that capture their structural and contextual information. In some implementations, the vector generation component 506 may incorporate pre-trained models to determine embeddings that align with specific compliance frameworks, such as NIST 800-53 or FedRAMP.

The compliance mapping component 508 may be configured as or otherwise support a means for mapping the vector embeddings to compliance controls in response to predefined criteria, the compliance controls may be stored in a knowledge graph database. In some implementations, the compliance mapping component 508 may determine the relevance of vector embeddings to specific compliance controls by analyzing the semantic content of the embeddings. In some implementations, the compliance mapping component 508 may utilize predefined criteria that may include keywords or phrases associated with compliance standards, such as NIST 800-53 or FedRAMP. In some implementations, the compliance mapping component 508 may interact with a user interface to allow users to input additional criteria or modify existing criteria for mapping vector embeddings to compliance controls.

The mapping storage component 510 may be configured as or otherwise support a means for storing the mappings between the vector embeddings and the compliance controls in the knowledge graph database. In some implementations, the mapping storage component 510 may store metadata associated with the mappings, such as timestamps or user annotations, to track the history of compliance evaluations. In some implementations, the mapping storage component 510 may organize the mappings in hierarchical structures within the knowledge graph database to reflect relationships between compliance controls and their sub-controls. In some implementations, the mapping storage component 510 may store mappings in formats compatible with external systems, such as JSON or XML, to support integration with third-party compliance tools.

In some examples, the metadata extraction component 512 may be configured as or otherwise support a means for extracting metadata from the ingested compliance artifacts, the metadata may include file type, creation date, and author information, and may associate the metadata with the vector embeddings stored in the knowledge graph database. In some implementations, the metadata extraction component 512 may determine additional metadata such as document version history or embedded comments to support compliance tracking. In some implementations, the metadata extraction component 512 may process metadata from encrypted files, which may require decryption keys to access relevant information. In some implementations, the metadata extraction component 512 may extract metadata from scanned images or PDFs by applying optical character recognition (OCR) techniques to identify embedded text-based metadata.

In some examples, the template generation component 514 may be configured as or otherwise support a means for generating compliance documentation templates based on the mappings stored in the knowledge graph database, the templates tailored to specific compliance frameworks selected by a user. In some implementations, the template generation component 514 may determine the structure of the templates by referencing predefined formatting guidelines associated with the selected compliance frameworks. In some implementations, the template generation component 514 may include options for users to customize sections of the templates, such as adding organization-specific headers or footers. In some implementations, the template generation component 514 may generate templates in multiple file formats, such as PDF, Word, or HTML, to accommodate diverse documentation requirements.

In some examples, the evidence retrieval component 516 may be configured as or otherwise support a means for retrieving additional evidence from external systems through secure API integration interfaces, the evidence may include configuration files, runtime logs, and code repositories, and may associate the evidence with the compliance controls in the knowledge graph database. In some implementations, the evidence retrieval component 516 may determine evidence from cloud-based storage systems to incorporate relevant compliance data. In some implementations, the evidence retrieval component 516 may retrieve evidence from container orchestration platforms by accessing pod logs or deployment configurations. In some implementations, the evidence retrieval component 516 may interact with identity and access management systems to determine audit logs or user activity reports for compliance evaluation.

In some examples, the vector conversion component 518 may be configured as or otherwise support a means for converting the mappings stored in the knowledge graph database into vector representations, the vector representations may enable similarity searches to identify related compliance controls across multiple compliance frameworks. In some implementations, the vector conversion component 518 may determine vector representations that align with specific compliance criteria, allowing for nuanced comparisons across different frameworks. In some implementations, the vector conversion component 518 may process mappings to generate vectors that capture semantic relationships between compliance controls, which may assist in identifying overlapping requirements. In some implementations, the vector conversion component 518 may incorporate machine learning techniques to refine vector representations, which may enhance the accuracy of similarity searches across diverse compliance standards.

In some examples, the user interface component 520 may be configured as or otherwise support a means for providing a user interface for uploading compliance artifacts, the user interface may be configured to display mapping results and may generate reports based on the mappings stored in the knowledge graph database. In some implementations, the user interface component 520 may allow users to upload compliance artifacts in bulk, which may include multiple file types such as PDFs, Word documents, and spreadsheets. In some implementations, the user interface component 520 may determine the status of uploaded artifacts and may display progress indicators to inform users about the processing stage of their submissions. In some implementations, the user interface component 520 may include filtering options that may allow users to sort mapping results based on compliance frameworks, such as NIST 800-53 or FedRAMP. In some implementations, the user interface component 520 may determine interactive visualizations, such as graphs or charts, that may represent the relationships between compliance artifacts and controls stored in the knowledge graph database. In some implementations, the user interface component 520 may allow users to export generated reports in multiple formats, such as PDF or Excel, to accommodate diverse documentation requirements.

Figure 6:
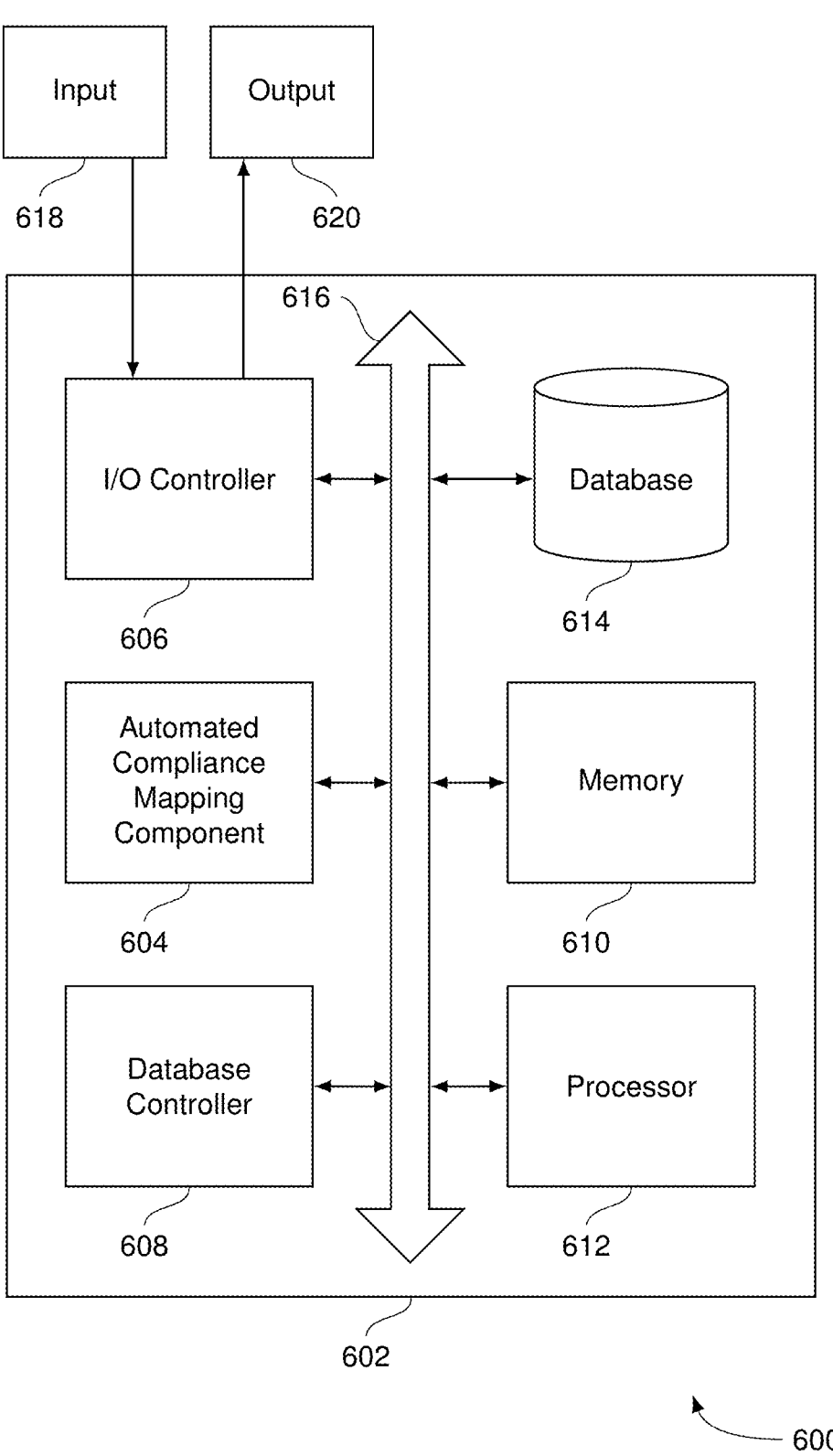
FIG. 6 shows a diagram of a system including a device that supports automating compliance control mapping with AI and LLMs in accordance with various aspects of the present disclosure.

FIG. 6 shows a diagram of a system 600 including a device 602 that supports automating compliance control mapping with AI and LLMs in accordance with aspects of the present disclosure. The device 602 may be an example of or include the components of a database server or an apparatus 402 as described herein. The device 602 may include components for bi-directional data communications including components for transmitting and receiving communications, including an automated compliance mapping component 604, an I/O controller 606, a database controller 608, memory 610, a processor 612, and a database 614. These components may be in electronic communication via one or more buses (e.g., bus 616).

The automated compliance mapping component 604 may be an example of an automated compliance mapping component 406 or 502 as described herein. For example, the automated compliance mapping component 604 may perform any of the methods or processes described above with reference to FIGS. 4 and 5. In some cases, the automated compliance mapping component 604 may be implemented in hardware, software executed by a processor, firmware, or any combination thereof.

The I/O controller 606 may manage input signals 618 and output signals 620 for the device 602. The I/O controller 606 may also manage peripherals not integrated into the device 602. In some cases, the I/O controller 606 may represent a physical connection or port to an external peripheral. In some cases, the I/O controller 606 may utilize an operating system such as iOS®, ANDROID®, MS-DOS®, MS-WINDOWS®, OS/2®, UNIX®, LINUX®, or another known operating system. In other cases, the I/O controller 606 may represent or interact with a modem, a keyboard, a mouse, a touchscreen, or a similar device. In some cases, the I/O controller 606 may be implemented as part of a processor. In some cases, a user may interact with the device 602 via the I/O controller 606 or via hardware components controlled by the I/O controller 606.

The database controller 608 may manage data storage and processing in a database 614. In some cases, a user may interact with the database controller 608. In other cases, the database controller 608 may operate automatically without user interaction. The database 614 may be an example of a single database, a distributed database, multiple distributed databases, a data store, a data lake, or an emergency backup database.

Memory 610 may include random-access memory (RAM) and read-only memory (ROM). The memory 610 may store computer-readable, computer-executable software including instructions that, when executed, cause the processor to perform various functions described herein. In some cases, the memory 610 may contain, among other things, a basic input/output system (BIOS) which may control basic hardware or software operation such as the interaction with peripheral components or devices.

The processor 612 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 612 may be configured to operate a memory array using a memory controller. In other cases, a memory controller may be integrated into the processor 612. The processor 612 may be configured to execute computer-readable instructions stored in a memory 610 to perform various functions (e.g., functions or tasks supporting automating compliance control mapping with AI and LLMs).

FIG. 7 shows a flowchart illustrating a method 700 that supports automating compliance control mapping with AI and LLMs in accordance with various aspects of the present disclosure. The operations of the method 700 may be implemented by one or more components of a networked computing system as described herein. For example, the operations of the method 700 may be performed by an automated compliance mapping component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 702, the method 700 may include ingesting compliance artifacts, the compliance artifacts including text and/or images extracted from uploaded files. The operations of 702 may be performed in accordance with examples as disclosed herein. In some examples, aspects of the operations of 702 may be performed by an artifact ingestion component 504 as described with reference to FIG. 5.

At 704, the method 700 may include analyzing the ingested compliance artifacts by generating vector embeddings for the extracted text and images. The operations of 704 may be performed in accordance with examples as disclosed herein. In some examples, aspects of the operations of 704 may be performed by a vector generation component 506 as described with reference to FIG. 5.

At 706, the method 700 may include mapping the vector embeddings to compliance controls in response to predefined criteria, the compliance controls stored in a knowledge graph database. The operations of 706 may be performed in accordance with examples as disclosed herein. In some examples, aspects of the operations of 706 may be performed by a compliance mapping component 508 as described with reference to FIG. 5.

At 708, the method 700 may include storing the mappings between the vector embeddings and the compliance controls in the knowledge graph database. The operations of 708 may be performed in accordance with examples as disclosed herein. In some examples, aspects of the operations of 708 may be performed by a mapping storage component 510 as described with reference to FIG. 5.

Figure 8:
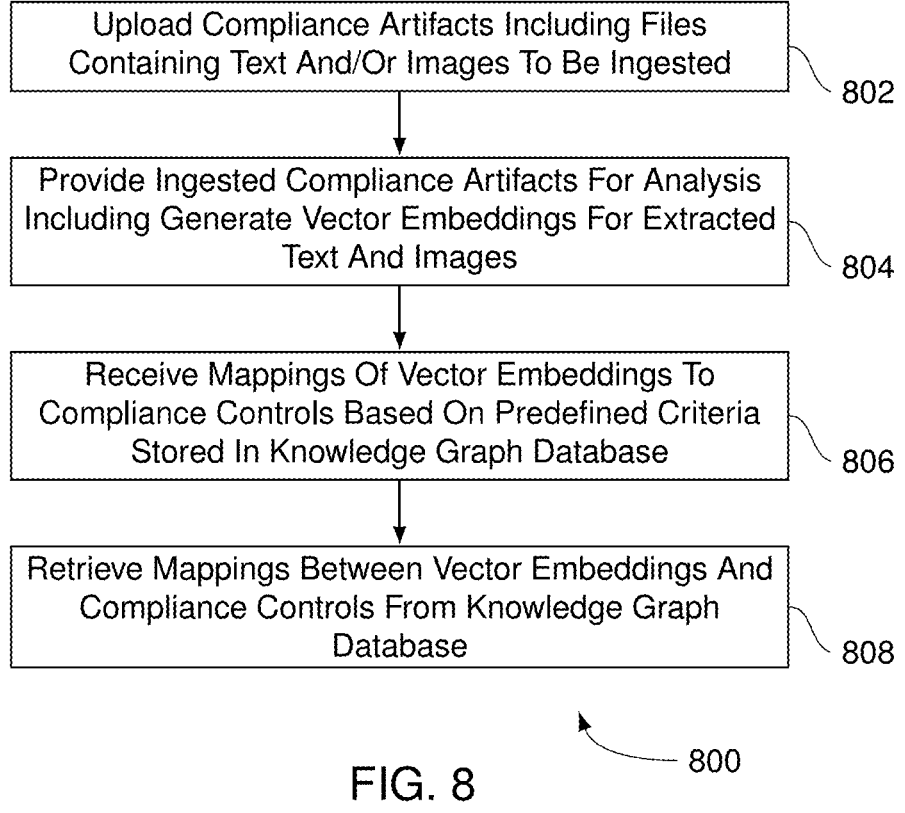

FIG. 8 shows a flowchart illustrating a method 800 that supports automating compliance control mapping with AI and LLMs in accordance with various aspects of the present disclosure. The operations of the method 800 may be implemented by one or more components of a networked computing system as described herein. For example, the operations of the method 800 may be performed by an automated compliance mapping component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 802, the method 800 may include uploading compliance artifacts, the compliance artifacts including files containing text and/or images to be ingested. The operations of 802 may be performed in accordance with examples as disclosed herein. In some examples, aspects of the operations of 802 may be performed by an artifact ingestion component 504 as described with reference to FIG. 5.

At 804, the method 800 may include providing the ingested compliance artifacts for analysis, the analysis including generating vector embeddings for the extracted text and images. The operations of 804 may be performed in accordance with examples as disclosed herein. In some examples, aspects of the operations of 804 may be performed by a vector generation component 506 as described with reference to FIG. 5.

At 806, the method 800 may include receiving mappings of the vector embeddings to compliance controls based on predefined criteria, the compliance controls stored in a knowledge graph database. The operations of 806 may be performed in accordance with examples as disclosed herein. In some examples, aspects of the operations of 806 may be performed by a compliance mapping component 508 as described with reference to FIG. 5.

At 808, the method 800 may include retrieving the mappings between the vector embeddings and the compliance controls from the knowledge graph database. The operations of 808 may be performed in accordance with examples as disclosed herein. In some examples, aspects of the operations of 808 may be performed by a mapping storage component 510 as described with reference to FIG. 5.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for automating compliance control mapping, comprising:

obtaining files containing compliance artifacts, the compliance artifacts being subject to compliance controls, the compliance controls being associated with regulatory standards, the regulatory standards defining frameworks to which the compliance controls adhere;

extracting text and images from the files, the text and images forming the compliance artifacts contained within the files;

analyzing the compliance artifacts by generating vector embeddings for the text and images;

mapping the vector embeddings to the compliance controls in response to predefined criteria to generate mappings between the vector embeddings of the compliance artifacts and the compliance controls, the compliance controls stored in a knowledge graph database; and storing the mappings between the vector embeddings and the compliance controls in the knowledge graph database.

2. The method of claim 1, further comprising extracting metadata from the compliance artifacts, the metadata including file type, creation date, and author information, and associating the metadata with the vector embeddings stored in the knowledge graph database.

3. The method of claim 1, further comprising generating compliance documentation templates based on the mappings stored in the knowledge graph database, the templates tailored to specific ones of the frameworks selected by a user.

4. The method of claim 1, further comprising retrieving evidence from external systems through secure application programming interface (API) integration interfaces, the evidence including configuration files, runtime logs, and code repositories, and associating the evidence with the compliance controls in the knowledge graph database.

5. The method of claim 4, wherein the secure API integration interfaces facilitate data exchange with the external systems, enhancing the retrieval of the evidence for compliance evaluation.

6. The method of claim 1, further comprising converting the mappings stored in the knowledge graph database into vector representations, the vector representations enabling similarity searches to identify related compliance controls across multiple ones of the frameworks.

7. The method of claim 1, further comprising providing a user interface for uploading the files containing the compliance artifacts, the user interface configured to display mapping results and generate reports based on the mappings stored in the knowledge graph database.

8. The method of claim 6, wherein the user interface provides options for selecting the frameworks, enabling customization of mapping processes according to user preferences.

9. The method of claim 1, wherein the vector embeddings are generated in response to predefined criteria that include keyword identification and contextual analysis of the text and images.

10. The method of claim 1, wherein the knowledge graph database is updated in response to changes in the frameworks, ensuring the mappings reflect current regulatory standards.

11. The method of claim 1, further comprising generating alerts in response to discrepancies between the compliance artifacts and the compliance controls stored in the knowledge graph database.

12. A system configured for automating compliance control mapping, comprising:

a processor;

memory coupled with the processor; and instructions stored in the memory and executable by the processor to cause the system to:

obtain files containing compliance artifacts, the compliance artifacts being subject to compliance controls, the compliance controls being associated with regulatory standards, the regulatory standards defining frameworks to which the compliance controls adhere;

extract text and images from the files, the text and images forming the compliance artifacts contained within the files;

analyze the compliance artifacts by generating vector embeddings for the text and images;

map the vector embeddings to the compliance controls in response to predefined criteria to generate mappings between the vector embeddings of the compliance artifacts and the compliance controls, the compliance controls stored in a knowledge graph database; and store the mappings between the vector embeddings and the compliance controls in the knowledge graph database.

13. The system of claim 12, wherein the instructions are further executable by the processor to cause the system to: extract metadata from the compliance artifacts, the metadata including file type, creation date, and author information, and associate the metadata with the vector embeddings stored in the knowledge graph database.

14. The system of claim 12, wherein the instructions are further executable by the processor to cause the system to: generate compliance documentation templates based on the mappings stored in the knowledge graph database, the templates tailored to specific ones of the frameworks selected by a user.

15. The system of claim 12, wherein the instructions are further executable by the processor to cause the system to: retrieve evidence from external systems through secure application programming interface (API) integration interfaces, the evidence including configuration files, runtime logs, and code repositories, and associate the evidence with the compliance controls in the knowledge graph database.

16. The system of claim 12, wherein the instructions are further executable by the processor to cause the system to: convert the mappings stored in the knowledge graph database into vector representations, the vector representations enabling similarity searches to identify related compliance controls across multiple ones of the frameworks.

17. The system of claim 12, wherein the instructions are further executable by the processor to cause the system to: provide a user interface for uploading the files containing the compliance artifacts, the user interface configured to display mapping results and generate reports based on the mappings stored in the knowledge graph database.

18. The system of claim 12, wherein the vector embeddings are generated in response to predefined criteria that include keyword identification and contextual analysis of the text and images.

19. The system of claim 12, wherein the knowledge graph database is updated in response to changes in the frameworks, ensuring the mappings reflect current regulatory standards.

20. A non-transitory computer-readable medium storing code for automating compliance control mapping, the code comprising instructions executable by a processor to:

obtain files containing compliance artifacts, the compliance artifacts being subject to compliance controls, the compliance controls being associated with regulatory standards, the regulatory standards defining frameworks to which the compliance controls adhere;

extract text and images from the files, the text and images forming the compliance artifacts contained within the files;

analyze the compliance artifacts by generating vector embeddings for the text and images;

map the vector embeddings to the compliance controls in response to predefined criteria to generate mappings between the vector embeddings of the compliance artifacts and the compliance controls, the compliance controls stored in a knowledge graph database; and store the mappings between the vector embeddings and the compliance controls in the knowledge graph database.

* * * * *